Nov. 8, 1955   J. F. DREYER, JR   2,723,348
HIGH FREQUENCY RESONANT CIRCUITS
Filed June 19, 1951   2 Sheets-Sheet 1

INVENTOR.
JOHN F. DREYER, JR.
BY
Campbell, Brumbaugh, Free & Graves
HIS ATTORNEYS Nov. 8, 1955   J. F. DREYER, JR   2,723,348
HIGH FREQUENCY RESONANT CIRCUITS
Filed June 19, 1951   2 Sheets-Sheet 2

INVENTOR.
JOHN F. DREYER, JR.
BY
Campbell, Brumbaugh, Free & Graves
HIS ATTORNEYS United States Patent Office 2,723,348
Patented Nov. 8, 1955

2,723,348

HIGH FREQUENCY RESONANT CIRCUITS

John F. Dreyer, Jr., Northport, N. Y., assignor to Telephonics Corporation, Huntington, N. Y., a corporation of New York Application June 19, 1951, Serial No. 232,323

3 Claims. (Cl. 250—40)

This invention relates to high frequency resonant circuits and, more particularly, to tunable resonant circuits employing a variable capacitor as the tuning element.

A common form of variable capacitor has a stator assembly of parallel metal plates which are supported by insulated bushings on a frame or housing. This frame carries at either end, bearings supporting a rotatable shaft to which is fixed a rotor assembly of parallel metal plates also parallel to and spaced between the stator plates. Upon rotating the shaft, the rotor plates mesh to a greater or less extent with the stator plates. Contacting springs are sometimes fastened to the housing near the bearings and are resiliently pressed against the rotor shaft at points beyond the assembly of rotor plates for electrically connecting the rotor to the housing. An inductor, which may at high frequencies be merely a short wire or loop of tubing, is ordinarily connected between a point on the stator and the frame.

When such conventional capacitor is operated at its highest resonant frequency, the stator and frame are substantially short-circuited and the principal inductance in the circuit resides in the self-inductance of the rotor shaft. Not only is the highest obtainable frequency restricted by the internal self-inductance of the capacitor, but also the voltage developed at resonance is extremely non-uniform. This non-uniformity is caused by the fact that the reactance of the capacitor is no longer a lumped constant but acts more in the nature of a transmission line. Conventional variable capacitors are not suitable for high power operation at very high frequencies because high power involves a high voltage between the stator and the rotor which necessitates substantial plate separation, resulting in a bulky capacitor. The enlargement of the capacitor is usually accompanied by an increased self-inductance.

These factors have militated against the use of conventional variable capacitors as the tuning elements in high frequency circuits.

Accordingly, the primary object of the present invention is to reduce the internal self-inductance of a variable capacitor in order that it may be used as the tuning element in resonant circuits at very high frequencies or, considered from a somewhat different point of view, in order that the variable capacitor may be dimensioned to handle greater power at a given high frequency.

The invention resides primarily in the provision of a conductive member for making contact with the rotor shaft between the rotor plates of a variable capacitor. The conductive member preferably wipes along most of the length of the rotor shaft within the frame or housing, including the spaces between all the rotor plates. The conductive member may take the form of spring fingers connected to the housing and making resilient contact against the rotor shaft.

For high frequency operation the inductor coupled to the capacitor takes the form of a short wide metallic strip connecting the entire width of the stator to the entire width of the conductive member. Under such conditions, each portion of the capacitor and a corresponding portion of the inductive strip form a closed circuit which is in parallel with every other portion of the capacitor and inductor, and all these portions are tunable as a whole to provide a relatively sharp resonance at several times the maximum operating frequency obtainable with a conventional variable capacitor of like dimensions. Furthermore, the Q of the new resonant circuit is superior to the Q of the conventional circuit notwithstanding the increased frequency.

In order that the invention may be more readily understood, it will now be described in detail with reference to the accompanying drawings wherein.

Figure 1:
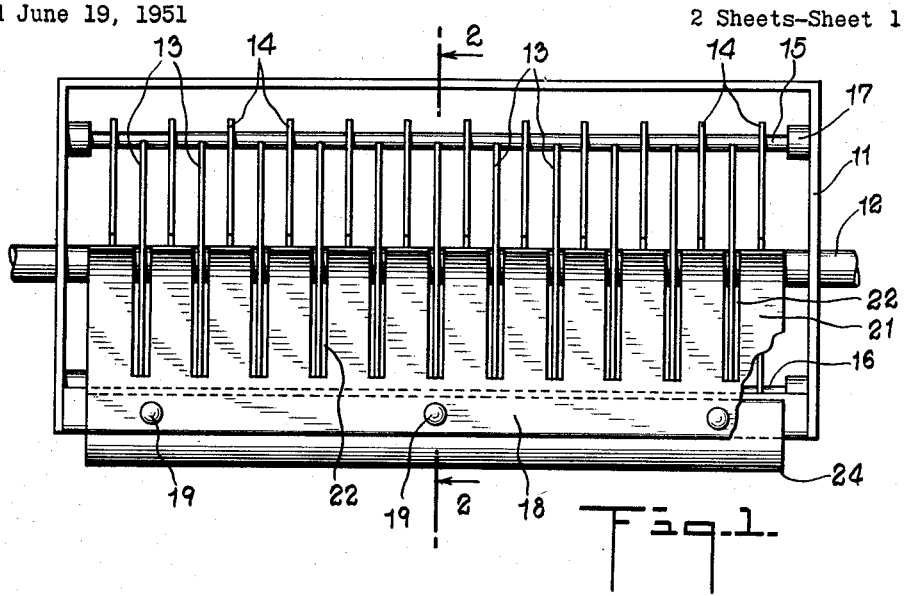
Fig. 1 is a side view of the novel resonant circuit.
Figures 2, 3:
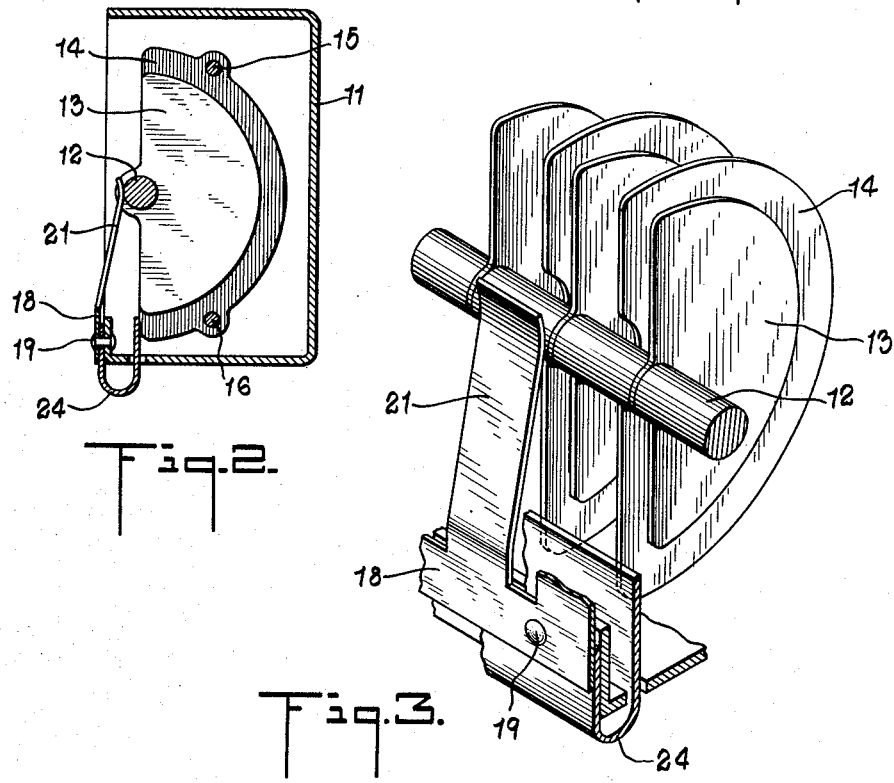
Fig. 2 is a cross-section taken along line 2, 2 of Fig. 1 in a plane parallel to the stator and rotor plates.
Fig. 3 is an enlarged detail of the structure of Fig. 1, showing in perspective the construction of the resilient spring fingers and the inductive strip.

Referring now to Fig. 1, a frame or housing 11 supports a rotor shaft 12 on which are fixed at right angles equally spaced metallic rotor plates 13, shown in Fig. 2 to be of generally semi-circular outline. Metallic stator plates 14, parallel to rotor plates 13 and laterally spaced therefrom, are fastened to support rods 15 and 16. Support rods 15 and 16 are held by insulated bushings 17 to frame 11. A conductive member 18 is secured, as by rivets 19, to a portion of frame 11 and is provided with resilient spring fingers 21 which contact rotor shaft 12. Narrow slots 22 are provided between the spring fingers 21 only sufficiently wide to permit clearance of the rotor plates 13 as shaft 12 rotates these plates out of mesh with the stator plates 14. The major portion of the distance between adjacent rotor plates on shaft 12 is wiped by spring fingers 21. To insure satisfactory contact, it is preferable that the spring fingers 21 be made of beryllium copper and the shaft 12 and that portion of the spring fingers 21 in contact therewith be plated heavily with silver.

A substantial improvement in high frequency operation as compared to a conventional capacitor may be obtained with the use of the spring fingers 21 of conductive member 18 when the capacitor is connected to a well known inductor such as a single loop of tubing. However, for frequencies in the hundreds of megacycles, an inductive strip 24 is preferably provided for connecting each stator plate 14 to conductive member 18 along its entire width. Resonant currents now encounter minimum inductive reactance when flowing around each portion of the circuit along the width of the capacitor.

Figure 4:
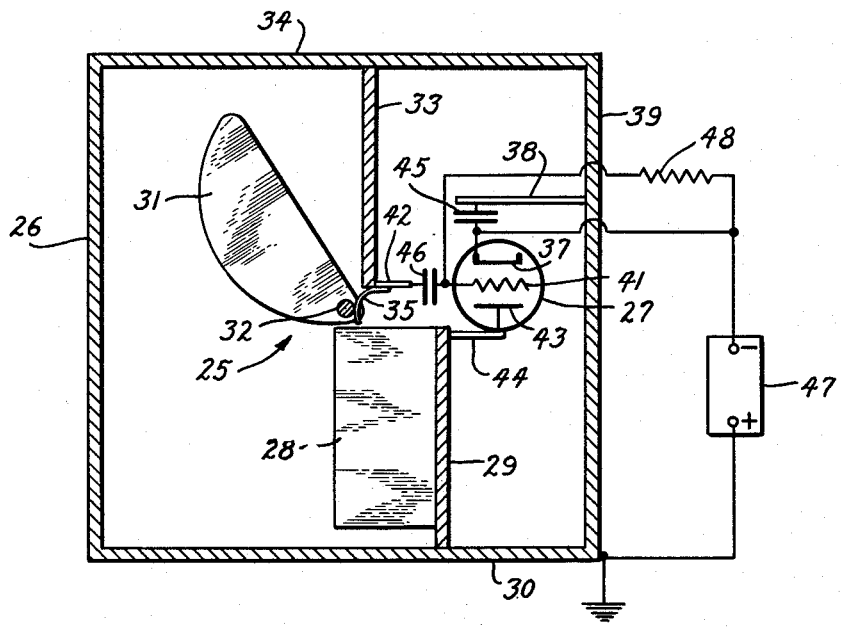
Fig. 4 is an end view of a modified form of the present invention, showing the connection of the resonant circuit to an oscillator tube.

Fig. 4 shows a capacitor 25 of the general type illustrated and discussed in connection with Figs. 1, 2 and 3 completely enclosed within a metal housing 26 and coupled to an electronic tube 27 to form a high frequency oscillator. Stator plates 28 are supported on a relatively heavy rib 29 which extends inwardly from a wall 30 of housing 26. Rotor plates 31 are fixed on a shaft 32 supported at either end of the housing. A relatively heavy rib 33 extends from a wall 34 of the housing 26 toward shaft 32 and carries a conductive member 35 which makes sliding electrical contact throughout most of the length of shaft 32.

Electronic tube 27 is a high frequency disk-seal tube such as a lighthouse or pencil triode mounted within housing 26. Tube 27 has a cathode 37, a control grid 41, and an anode 43. Cathode 37 is coupled through a fixed capacitor 45 to a bus bar 38 mounted on a wall 39 interconnecting walls 30 and 34 of housing 26. Control grid 41 is coupled through a fixed capacitor 46 to a bus bar 42 extending from rib 33 closely adjacent shaft 32. Anode 43 is connected by means of a bus bar 44 to the inner end of rib 29 which supports the stator plates 28. The capacitors 45 and 46, which are preferably wide flat mica units of very low inductance, act to isolate the direct potentials on the cathode 37 and grid 41 from the housing 26. The requisite operating potentials are supplied by a power supply 47 having a postive terminal at ground potential connected to housing 26 and a negative terminal at a substantial negative potential connected directly to cathode 37 and through a grid-leak resistor 48 to grid 41.

Figure 5:
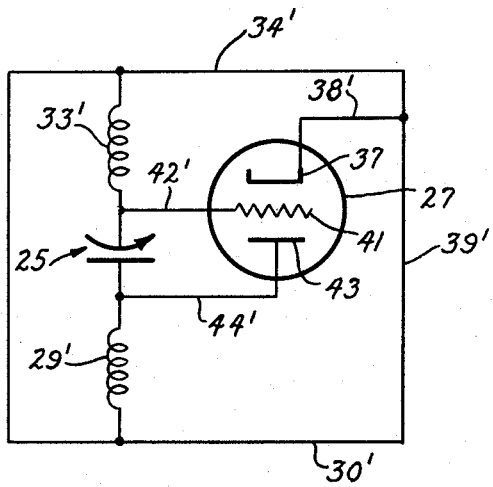
Fig. 5 is a wiring diagram of the electrical circuit corresponding to the structure of Fig. 4.

Fig. 5 shows that the electrical circuit equivalent to the structure of Fig. 4 is a simple Hartley oscillator. The primed reference numerals indicate the corresponding electrical elements and ribs 33 and 29 are represented by grid and plate inductors 33' and 29', respectively. The resonant currents flow through inductor 33', capacitor 25 and inductor 29', and the circuit is completed through leads 30', 39' and 34', corresponding to the inside walls of housing 26. Grid 41 and anode 43 are connected to opposite ends of the tuned circuit with respect to cathode 37. The exciting voltage, that is, the grid-cathode voltage, has accordingly the necessary approximate 180 degrees phase difference with respect to the anode-cathode voltage. The ratio of the former voltage to the latter voltage is primarily determined by the self-inductance of rib 33 relative to that of rib 29.

Any inductance in the common connection to the cathode would reduce feedback in direct proportion to the operating frequency. Since no magnetic flux can extend outside of the completely enclosed housing 26 no flux linkages can occur on the inside surface of the housing, and therefore no potential differences can exist between different points on the walls of the housing 26. Accordingly, the walls of housing 26 may be considered as at ground potential and cathode 37 may be connected by a lead 38' corresponding to bus bar 38 to the nearest point on the inside of housing 26. This means that the stray inductance in the cathode circuit is minimized. As a result the oscillator has an essentially constant feedback over the tuning range.

A significant advantage of the resonant circuit shown in Fig. 4 arises from the fact that ribs 33 and 29 function as inductors having inductances which increase in direct proportion to their vertical height as viewed in Fig. 4 and inversely in proportion to their width as measured in the direction of shaft 32 perpendicularly to the plane of Fig. 4. In the arrangement of Figure 4, it is apparent that the capacitance could be increased by increasing the number of plates and hence the width. Within limits this does not decrease the maximum resonant frequency since the ribs 33 and 29 of Figure 4 are increased in width, thus producing a proportionate reduction of the inductance. Thus the product of the inductance and capacitance tends to remain constant, and inasmuch as the resonant frequency of a tuned circuit is inversely proportional to the square root of this product, the maximum frequency tends to remain constant likewise. This makes possible a considerable freedom of design permitting large capacitor plate spacing suitable for high voltage applications, such as in transmitters for counter-measure or jamming transmission. Greater freedom of design is obtained in that higher circuit minimum capacitance may be used. This minimizes the importance of the vacuum tube inter-element capacitances, which vary from tube to tube and also vary microphonically due to vibration.

In order to illustrate the advantages derived from one aspect of the invention, a conventional capacitor was connected to a very small single turn loop of about ¾ inch in diameter and the highest obtainable resonant frequency measured. Subsequently the same capacitor was equipped with spring contact fingers and a wide short-circuiting bar connected between the stator and the spring fingers in accordance with the teachings of the present invention. The maximum resonant frequency was quadrupled indicating a reduction of about 16:1 in the inductance of the circuit.

I claim:

1. A resonant circuit comprising a capacitor having stator and rotor plates, said rotor plates being fixed to and electrically connected to a rotatable shaft for meshing with said stator plates, an electrically conductive member for making movable contact along the major portion of the shaft between the rotor plates and adjacent spaces occupied by the stator plates, and an inductive member forming at least a portion of a conductive path between said stator plates and said conductive member, said inductive member comprising an electrically conductive metallic member having a width to span said stator plates, said member being joined near one edge to each of the stator plates and joined near its other edge to said conductive member substantially along the length thereof, whereby each portion of the capacitor and a corresponding portion of the inductive member form a closed circuit which is parallel with every other portion of the capacitor and the inductor formed by the inductive member.

2. A resonant circuit as set forth in claim 1, said inductive member forming, at least in part, a housing about said capacitor.

3. A resonant circuit as set forth in claim 1, said inductive member comprising a substantially U-shaped metallic strip, and a housing supporting the strip and the inductive member.

References Cited in the file of this patent

UNITED STATES PATENTS

| | | |
|---|---|---|
| 1,714,662 | Dubilier | May 28, 1929 |
| 1,741,152 | Gillen | Dec. 31, 1929 |
| 1,957,243 | Bol et al. | May 1, 1934 |
| 2,001,600 | Cohen | May 14, 1935 |
| 2,384,504 | Thias | Sept. 11, 1945 |
| 2,540,137 | Page | Feb. 6, 1951 |
| 2,542,416 | Kach et al. | Feb. 20, 1951 |

FOREIGN PATENTS

| | | |
|---|---|---|
| 258,129 | Switzerland | Apr. 16, 1949 |
| 970,938 | France | June 28, 1950 |